Aug. 19, 1952 J. R. HOLLINS 2,607,864
SWITCH FOR EMERGENCY STOP FLASHER SIGNAL SYSTEM
Original Filed April 12, 1949
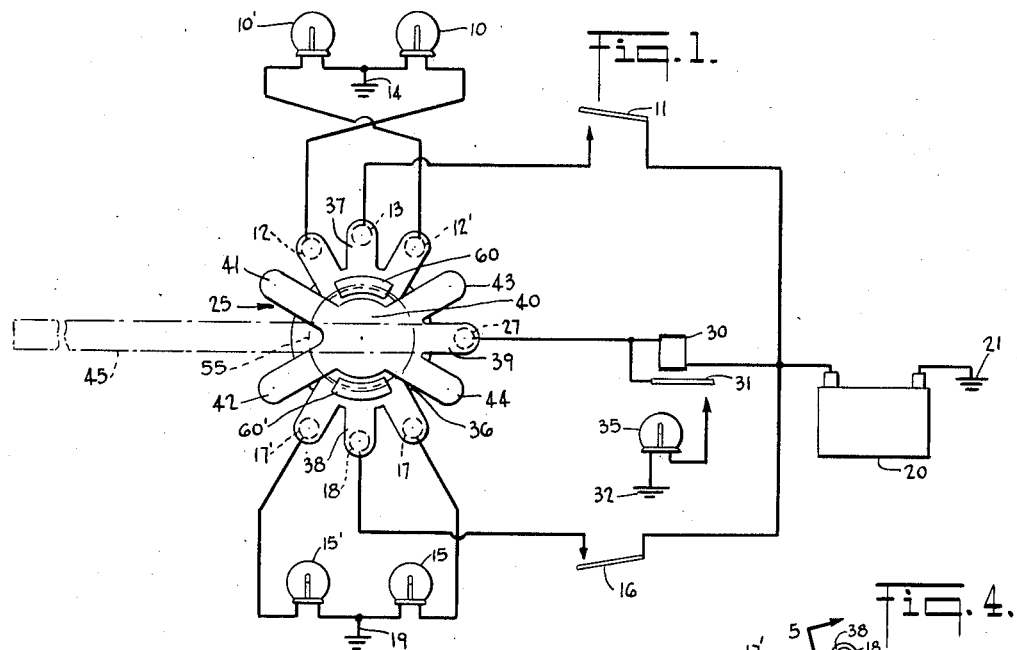
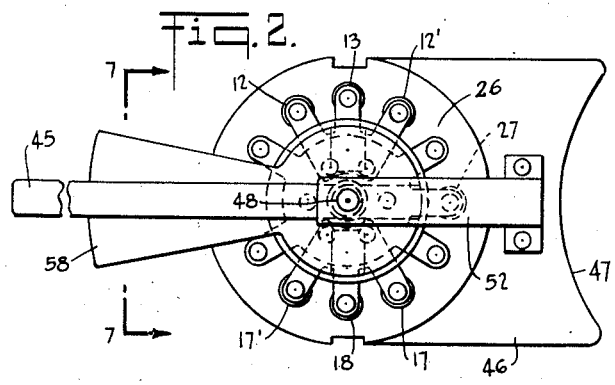
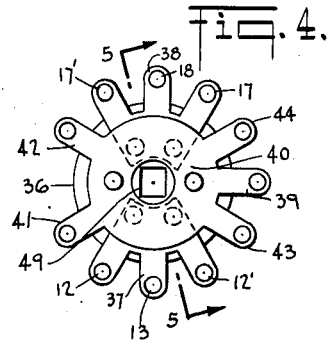
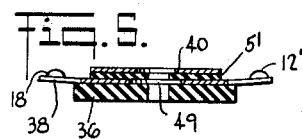
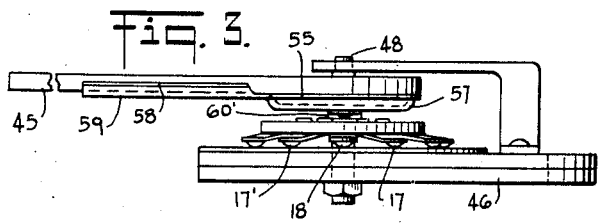
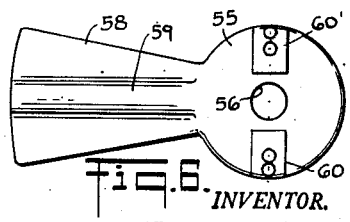
INVENTOR.
JESSE R. HOLLINS
BY
ATTORNEY Patented Aug. 19, 1952

2,607,864

UNITED STATES PATENT OFFICE 2,607,864

SWITCH FOR EMERGENCY STOP FLASHER SIGNAL SYSTEM

Jesse R. Hollins, Brooklyn, N. Y.

Original application April 12, 1949, Serial No. 87,010. Divided and this application March 11, 1950, Serial No. 149,129

4 Claims. (Cl. 200—11)

1

This invention relates to a novel switch for use with a vehicle lighting system whereby vehicle marker lamps may be used as twin indicators or, alternatively, as emergency stop warning signals, this being a division of my application Serial No. 87,010 filed April 12, 1949.

Automotive passenger vehicles and trucks are equipped with parking lamps and stop lamps, the latter usually being activated by a brake actuated switch. In addition, and particularly in the last few years, these vehicles have been equipped with extra lamps operated by a selector switch to indicate turning movement of the vehicle, and are frequently equipped with special "emergency stop" warning lamps. These extra lamps and their control switches add to the expense and complexity of the electric lighting system of the vehicle.

In my copending application Serial No. 79,378 filed March 5, 1949, which issued as U. S. Patent 2,562,273 on July 31, 1951, for "Directional Lamp Switch," I have shown and described a novel switch associated with a flasher unit and a pilot lamp whereby the vehicle parking and/or stop lamps may be selectively "flashed" to indicate a turning movement. The switch includes circuit closure members normally connecting the parking and stop lamp circuits to their respective control circuits. An additional circuit closure member is provided and is arranged normally to be inoperative while being selectively operable by a projecting handle to energize the parking and/or stop lamps on one or the other side of the vehicle through a circuit including a flasher unit. Thereby, either the left-hand or the right-hand parking and/or stop lamps are "flashed" to indicate a turning movement. At the same time, a pilot or indicator lamp within the operator's field of vision is flashed to indicate operation of the directional circuit.

In accordance with the present invention, a further circuit closure or circuit bridge member is provided which is normally engaged with one of the above mentioned circuit closure members and is disengaged from, or out of contact with, the other mentioned circuit closure member. This bridge member has a releasable, frictional engagement with the switch handle, so that it normally moves with the latter while maintaining its pre-set relation to the mentioned circuit closure members. That is, the bridge member is normally in contact with the circuit closure members connecting the marker lamps to their normal control circuits and is out of contact with the circuit closure member which is selectively

2 operative to connect the marker lamps in the direction circuit.

Should the vehicle make an emergency stop, or park along the highway, the bridge member is moved relative to the switch handle and such movement positions the bridge member to electrically interconnect all the switch circuit closure members. Through an added contact on the directional circuit closure members, all the marker lamps are simultaneously connected to be energized through the flasher unit. Thus, all the marker lamps are "flashed" to give warning of the emergency stopped condition of the vehicle.

With the foregoing in mind, it is an object of the present invention to provide a novel emergency stop signalling system for vehicles.

Another object is to provide such a system utilizing conventional vehicle lamp circuits.

A further object is to provide a novel switch and associated circuit elements whereby conventional parking and/or stop lamp circuits may be utilized to provide emergency stop warning signals.

These, and other objects, advantages and novel features of the invention will be apparent from the following description and the accompanying drawing . In the drawing:

Fig. 1 is a schematic wiring diagram of vehicle parking and stop lamp circuits embodying the invention;

Fig. 2 is a plan view of a novel switch according to the invention;

Fig. 3 is a side elevation view of the switch;

Fig. 4 is a bottom plan view of the movable direction indicating contact member of the switch;

Fig. 5 is a transverse sectional view on the line 5—5 of Fig. 4;

Fig. 6 is a bottom plan view of the emergency stop signal bridge contact member according to the invention; and Fig. 7 is a transverse sectional view on the line 7—7 of Fig. 2.

Referring to Fig. 1, a vehicle marker lamp arrangement is illustrated as including parking lamps 10, 10', which may be on the front of the vehicle, a battery 20 grounded at 21, stop lamps 15, 15' grounded at 19, a parking lamp control switch 11, and a brake actuated stop lamp switch 16. Switches 11 and 16 are connected in parallel to battery 20 and, in the present case, are connected to their respective lamp circuits through a novel, selectively operable switch 25.

The latter includes an insulating plate 26 on which are mounted a first set of contacts 12, 12' and 13 and a diametrically opposite set of contacts 17, 17' and 18. A seventh contact 27 is mounted midway between contacts 12' and 17. All of the contacts are arranged equidistant from the center of plate 26, and the distance of contact 27 from contact 12 or 17 is twice the spacing of the contacts of each set of three.

Contacts 12, 12' are connected to parking lamps 10, 10' respectively, commonly grounded at 14. Contact 13 is connected to switch 11. Contacts 17, 17' are connected to stop lamps 15, 15' respectively, and contact 18 is connected to switch 16. Contact 27 is connected to battery 20 through flasher unit 30 which has a movable contact 31 controlling the energization of a pilot or indicator lamp 35 grounded at 32. When flasher 30 is energized, contact 31 intermittently energizes lamp 35, which flashes in synchronism with operation of the flasher.

A second and smaller insulating plate 36 is rotatably mounted on plate 26 and carries diametrically opposite closure members 37, 38, each having three arms arranged, in the position shown in Fig. 1, to engage contacts 12, 12', 13 and 17, 17', 18, respectively. Thus, in the position of Fig. 1, switch 11 is in circuit with both lamps 10, 10' through member 37, and switch 16 is in circuit with both lamps 15, 15' through member 38. Consequently, closure of either switch 11 or 16 will light both of its respective lamps.

Plate 36 carries a second contact closure member 40 having a pair of divergent arms 41, 42 projecting from one side midway between members 37, 38, and three arms 39, 43, 44 projecting from the opposite side. Arm 39 normally engages contact 27. An operating handle or lever is secured to and projects from plate 36 and, when the plate is rotated clockwise one step, arm 41 engages contact 12, arm 43 engages contact 27, and arm 44 engages contact 17.

Accordingly, lamp 10 is energized over the following circuit: battery 20, flasher unit 30, contact 27, arm 43, member 40, arm 41 and contact 12. Lamp 15 is correspondingly energized through unit 30, arm 44 and contact 17. Lamps 10, 15 are thus "flashed," while lamps 10', 15' remain steadily lighted. Lamp 35 is likewise "flashed" in synchronism with the flasher unit, as described. A flashing "right turn" signal is thus provided, with operativeness indicated by lamp 35. A corresponding action takes place when lever 45 is moved one step counter-clockwise to signal a "left turn."

In accordance with the invention, a second movable insulating plate 55 is provided carrying diametrically opposite bridge contacts 60, 60'. In a manner described hereinafter, plate 55 is releasably constrained to move with lever 45, but may be moved independently thereof. Contacts 60, 60' normally engage only members 37, 38, respectively, being releasably held in angularly spaced relation to the arms of member 40, irrespective of movement of lever 45 and plate 36.

To indicate an emergency stop, plate 55 is moved in either direction relative to handle 45. This movement causes bridge 60 to electrically interconnect members 40 and 37, and bridge 60' to electrically interconnect members 40 and 38. As one of the arms 39, 43, 44 is in engagement with contact 27 in any of the three switch positions, such movement of plate 55 effects connection of all the lamps to the battery through the flasher unit and through members 40, 37 and 38. Consequently, all the lamps 10, 10', 15, 15' are simultaneously flashed, as well as pilot or indicator lamp 35.

Figs. 2 through 7 illustrate an actual embodiment of switch 25. Contacts 12, 12', 13, 17, 17', 18 and 27 serve as rivets to secure plate 26 to an insulating bracket 46 having an arcuate end 47 to embrace the vehicle steering column. Bracket 46 has a circular aperture forming a bearing for a cylindrical end on a polygonal cross-section shaft 48 fitting mating apertures in plate 36 and handle 45. The opposite cylindrical end of shaft 48 has a bearing fit in a bracket 52 secured to bracket 46. Contact members 37, 38 and 40 are riveted to plate 36, member 40 being separated from members 37, 38 by a dielectric spacer 51.

Plate 55 has bridge members 60, 60' riveted thereto and has a circular aperture 56 fitting loosely around shaft 48. The plate has an upwardly offset surface 57 engaging the inner end of handle 45 and an upwardly offset radial extension 58 alignable with handle 45. Extension 58 is relatively wide, and has a central depression 59 fitting handle 45. Depression 59 serves to releasably lock plate 55 to move with handle 45. Relative movement of plate 55 and handle 45 to provide an emergency stop warning is effected by simply pushing the edge of extension 58 in one direction or the other relative to handle 45.

The arrangement is not limited to parking or stop lamps, but may be used with other conventional lamps such as fog lamps, for example. The circuit arrangement and novel switch are simple and inexpensive.

While a specific embodiment of the invention has been shown and described in detail to illustrate the application of the principles thereto, it should be understood that the invention may be otherwise embodied without departing from such principles.

What is claimed is:

1. For use with a vehicle lighting system; a selector switch including a fixed member carrying a pair of first contacts, a second contact intermediate said first contacts and a third contact, a first movable member carrying a first circuit closure comprising a conductor having spaced fingers adapted in respective positions to connect either or both of said first contacts to said second contact and a second circuit closure comprising a conductor continuously engaged with said third contact and having spaced fingers adapted in respective positions to connect either of said first contacts to said third contact, and a second member releasably engaged to move with said first movable member and carrying a circuit bridge member comprising a conductor normally engaged only with said first circuit closure, said second movable member being movable relative to said first movable member to engage said circuit bridge member with both of said circuit closures.

2. For use with a vehicle lighting system; a selector switch including a fixed member carrying a pair of first contacts, a second contact intermediate said first contacts, and a third contact, a first movable member carrying a first circuit closure comprising a conductor having spaced fingers adapted in respective positions to connect either or both of said first contacts to said second contact and a second circuit closure comprising a conductor continuously engaged with said third contact and having spaced fingers adapted in respective positions to connect either of said first contacts to said third contact, a second member carrying a circuit bridge member comprising a conductor normally engaged only with said first circuit closure, a shaft rotatably mounted in said fixed member and secured to rotate with said first movable member, said second movable member being rotatable on said shaft, a switch operating handle secured to said shaft and means releasably constraining said second movable member to move with said handle, said second movable member being movable relative to said handle to engage said circuit bridge member with both of said circuit closures.

3. For use with a vehicle lighting system, a selector switch including a fixed member carrying a pair of first contacts, a second contact intermediate said first contacts, and a third contact, a first movable member carrying a first circuit closure comprising a conductor having spaced fingers adapted in respective positions to connect either or both of said first contacts to said second contact and a second circuit closure comprising a conductor continuously engaged with said third contact and having spaced fingers adapted in respective positions to connect either of said first contacts to said third contact, a second member carrying a circuit bridge member comprising a conductor normally engaged only with said first circuit closure, a shaft rotatably mounted in said fixed member and secured to rotate with said first movable member, said second movable member being rotatable on said shaft, a switch operating handle secured to said shaft and means releasably constraining said second movable member to move with said handle, said handle being movable from a neutral position, in which said first closure connects both first contacts to said second contact, to either of a pair of second positions in which said first closure connects one first contact to said second contact and said second closure connects the other first contact to said third contact, said second movable member, in each of said positions, being releasably retained by said handle in engagement with only said first closure, and said second movable member being movable relative to said handle to engage said circuit bridge member with both of said circuit closures.

4. For use with a vehicle lighting system, a selector switch including a fixed member carrying opposing pairs of first contacts, a pair of opposing second contacts one being intermediate each pair of said first contacts, and a third contact, a first movable member carrying a pair of first circuit closures each comprising a conductor having spaced fingers adapted in respective positions to connect either or both of a pair of first contacts to a second contact and a second circuit closure comprising a conductor continuously engaged with said third contact and having spaced fingers adapted in respective positions to connect a first contact of each pair to said third contact, a second movable member carrying a pair of circuit bridge members each comprising a conductor normally engaged only with a first circuit closure, a shaft rotatably mounted in said fixed member and secured to rotate with said first movable member, said second movable member being rotatable on said shaft, a switch operating handle secured to said shaft and means releasably constraining said second movable member to move with said handle, said handle being movable from a neutral position, in which each first closure connects a pair of first contacts to a second contact, to either of a pair of second positions in which each first closure connects one first contact of a pair to a second contact and each second closure connects the other first contact of a pair to said third contact, said second movable member, in each of said positions, being releasably retained by said handle in engagement with only said first closures, and said second movable member being movable relative to said handle to interconnect each first closure to a second closure through a circuit bridge member.

JESSE R. HOLLINS.

REFERENCES CITED

The following references are of record in the file of this patent:

UNITED STATES PATENTS

| Number | Name | Date |
| --- | --- | --- |
| 1,231,361 | Hunt | Jan. 26, 1917 |
| 1,704,709 | Murray | Mar. 2, 1929 |
| 2,086,959 | Rom | July 13, 1937 |
| 2,122,508 | Bell | July 5, 1938 |
| 2,456,242 | Bailey | Dec. 14, 1948 |